(12) United States Patent
Djukic et al.

(10) Patent No.: US 11,595,761 B2
(45) Date of Patent: Feb. 28, 2023

(54) DETECTING AND LOCALIZING ACOUSTIC SIGNALS WITH AN OPTICAL NETWORK

(71) Applicant: Ciena Corporation, Hanover, MD (US)

(72) Inventors: Petar Djukic, Ottawa (CA); Yinqing Pei, Kanata (CA); Maryam Amiri, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/358,558

(22) Filed: Jun. 25, 2021

(65) Prior Publication Data

US 2022/0417672 A1  Dec. 29, 2022

(51) Int. Cl.
| | |
|---|---|
| *H04B 10/532* | (2013.01) |
| *H04R 25/00* | (2006.01) |
| *H04R 23/00* | (2006.01) |
| *H04B 10/25* | (2013.01) |
| *H04B 10/275* | (2013.01) |
| *H04B 10/61* | (2013.01) |

(52) U.S. Cl.
CPC ........... *H04R 23/008* (2013.01); *H04B 10/25* (2013.01); *H04B 10/275* (2013.01); *H04B 10/532* (2013.01); *H04B 10/615* (2013.01)

(58) Field of Classification Search
CPC ..................... H04R 23/008; H04B 10/61–65
See application file for complete search history.

(56) References Cited

U.S. PATENT DOCUMENTS

| | | | | |
|---|---|---|---|---|
| 4,817,204 | A | * | 3/1989 | Jannelli ................... H04M 1/74 |
| | | | | 398/139 |
| 4,817,206 | A | * | 3/1989 | Calvani ............... H04B 10/532 |
| | | | | 398/205 |
| 8,477,679 | B2 | | 7/2013 | Sharifian et al. |
| 8,887,217 | B2 | | 11/2014 | Salem et al. |
| 9,060,292 | B2 | | 6/2015 | Callard et al. |
| 9,432,257 | B2 | | 8/2016 | Li et al. |
| 9,686,816 | B2 | | 6/2017 | Sun et al. |
| 9,774,392 | B2 | | 9/2017 | Doucet et al. |
| 9,819,565 | B2 | | 11/2017 | Djukic et al. |

(Continued)

FOREIGN PATENT DOCUMENTS

| | | | | |
|---|---|---|---|---|
| FR | 2618549 | * | 1/1989 | ............. G01D 5/334 |

OTHER PUBLICATIONS

Teixeira et al., Advanced Fiber-Optic Acoustic Sensors, Photonic Sensors / vol. 4, No. 3, 2014: 198-208.

(Continued)

*Primary Examiner* — Nathan M Cors
(74) *Attorney, Agent, or Firm* — Baratta Law PLLC; Lawrence A. Baratta, Jr.

(57) ABSTRACT

An optical network element includes a connection to an optical fiber in an optical line system including a coherent receiver; a microphone configured to detect sound; and circuitry connected to the microphone and configured to cause transmission of information related to sounds detected by the microphone to a receiver at an end of the optical line system, wherein the transmission is over the optical fiber in the optical line system to the coherent receiver. The optical network element can include a polarization controlling device connected to the circuitry and configured to modulate a state-of-polarization (SOP) envelope for the transmission.

14 Claims, 7 Drawing Sheets

(56) References Cited

U.S. PATENT DOCUMENTS

| | | |
|---|---|---|
| 9,832,681 B2 | 11/2017 | Callard et al. |
| 9,871,582 B2 | 1/2018 | Djukic et al. |
| 9,980,284 B2 | 5/2018 | Djukic et al. |
| 10,015,057 B2 | 7/2018 | Djukic et al. |
| 10,069,570 B2 | 9/2018 | Djukic et al. |
| 10,148,578 B2 | 12/2018 | Morris et al. |
| 10,153,869 B2 | 12/2018 | Djukic et al. |
| 10,390,348 B2 | 8/2019 | Zhang et al. |
| 10,448,425 B2 | 10/2019 | Au et al. |
| 10,491,501 B2 | 11/2019 | Armolavicius et al. |
| 10,623,277 B2 | 4/2020 | Djukic et al. |
| 10,631,179 B2 | 4/2020 | Djukic et al. |
| 10,644,941 B2 | 5/2020 | Djukic et al. |
| 10,746,602 B2 | 8/2020 | Pei et al. |
| 10,887,899 B2 | 1/2021 | Au |
| 10,945,243 B2 | 3/2021 | Kar et al. |
| 2011/0243557 A1* | 10/2011 | Croussore ........... H04J 14/0212 398/45 |
| 2014/0229210 A1 | 8/2014 | Sharifian et al. |
| 2014/0270804 A1* | 9/2014 | Hoshida ............. H04J 14/0272 398/154 |
| 2017/0359127 A1* | 12/2017 | Moeller ................ H04B 10/58 |
| 2018/0062943 A1 | 3/2018 | Djukic et al. |
| 2019/0230046 A1 | 7/2019 | Djukic et al. |
| 2019/0379589 A1 | 12/2019 | Ryan et al. |
| 2020/0067935 A1 | 2/2020 | Carnes, III et al. |
| 2020/0313380 A1 | 10/2020 | Pei et al. |
| 2020/0351380 A1 | 11/2020 | Fedorov et al. |
| 2020/0387797 A1 | 12/2020 | Ryan et al. |
| 2021/0028973 A1 | 1/2021 | Cote et al. |
| 2021/0076111 A1 | 3/2021 | Shew et al. |
| 2021/0150305 A1 | 5/2021 | Amiri et al. |

OTHER PUBLICATIONS

Cantono et al., "Sub-Hertz Analysis of Polarization of Light in a Transcontinental Submarie Cable," 2020 European Conference on Optical Communications (ECOC), Dec. 1, 2020, pp. 1-3.

Oct. 13, 2022, International Search Report and Written Opinion for International Patent Application No. PCT/US2022/033739.

\* cited by examiner

DETECTING AND LOCALIZING ACOUSTIC SIGNALS WITH AN OPTICAL NETWORK

FIELD OF THE DISCLOSURE

The present disclosure generally relates to optical networking. More particularly, the present disclosure relates to systems and methods for detecting and localizing acoustic signals with an optical network.

BACKGROUND OF THE DISCLOSURE

Acoustic signals can be detected with fibers if a vibration is introduced on the fiber commensurate with the accosting oscillations. For example, combining mechanical elements, which introduce vibrations correspondent to sound on the fiber, see, e.g., Teixeira, J. G. V., Leite, I. T., Silva, S. et al. Advanced fiber-optic acoustic sensors. Photonic Sens 4, 198-208 (2014). doi:10.1007/s13320-014-0148-5, the contents of which are incorporated by reference. This approach extends the application space of fiber-based sensor networks beyond vibrations only. However, implementing mechanical elements may not be feasible in many situations, such as underwater cables. Also, the vibration element may not be a good microphone, with limited range and those not very useful and it may significantly impair the optical signal on the cable (the mechanical example assumes traffic is not carried on the cable). Approaches based on Optical time-domain reflectometer (OTDR) technologies using Brillouin, Rayleigh, or Raman scattering do not work well on long-distance due to reflections at amplifiers.

Optical networks are deployed throughout the world for communication, including both terrestrial fiber networks and submarine cables. Optical network are especially prevalent in data centers, where they are used to connect various servers and routers. Due to the ubiquitous coverage of optical networks, it would be advantageous to integrate acoustic signal detection. Existing acoustic fiber optical systems are difficult to implement in every environment, such as underwater for submarine cables.

BRIEF SUMMARY OF THE DISCLOSURE

The present disclosure relates to systems and methods for detecting and localizing acoustic signals with an optical network. Specifically, the present disclosure utilizes existing optical line systems that are deployed for communication, including data center, terrestrial and submarine systems, to provide acoustic signal detection as well as localization. Various use cases exist including submarine detection, security for data centers, and the like. The approach described herein includes encoding the detected sound signals and location, i.e., a specific line amplifier site. In an embodiment, the detected sound signals and location are modulated on traffic carrying signals via a polarization scrambler. Other embodiments include incorporating the detected sound signals and location in a communication channel, such as via an Optical Service Channel (OSC).

In an embodiment, an optical network element includes a connection to an optical fiber in an optical line system including a coherent receiver; a microphone configured to detect sound; and circuitry connected to the microphone and configured to cause transmission of information related to sound detected by the microphone to a receiver at an end of the optical line system, wherein the transmission is over the optical fiber in the optical line system to the coherent receiver. The optical network element can further include a polarization controlling device connected to the circuitry and configured to modulate a state-of-polarization (SOP) envelope for the transmission of the information.

The polarization controlling device can be a polarization controller and the transmission includes analog modulation of the SOP envelope. The polarization controlling device can be a polarization scrambler and the transmission includes digital modulation of the SOP envelope. The SOP can be modulated on an order of 100s of kHz or less thereby having no impact on traffic modulated thereon. The optical line system can be a submarine system with the optical network element including a repeater therein including one or more optical amplifiers. The optical line system can be a terrestrial system deployed in an optical ring with the optical network being one of a plurality of optical network elements on the optical ring. The transmission can be via packets over a communication channel.

In another embodiment, a coherent optical receiver includes circuitry configured to receive an electrical signal corresponding to an optical signal transmitted over an optical line system, detect and track state-of-polarization (SOP) changes in the optical signal, and extract information related to sound detected on the optical line system based on the SOP changes. The information can include a plurality of different locations in the optical line system, and wherein the circuitry is further configured to localize the sound to the plurality of different locations.

The information can be analog modulated on an SOP envelope by a polarization controller. The information can be digitally modulated on an SOP envelope by a polarization scrambler. An SOP is modulated on an order of 100s of kHz or less thereby having no impact on traffic modulated thereon. The optical line system can be a submarine system with the location including a repeater therein including one or more optical amplifiers. The optical line system can be a terrestrial system deployed in an optical ring.

In a further embodiment, a method includes receiving an electrical signal corresponding to an optical signal transmitted over an optical line system, detecting and tracking state-of-polarization (SOP) changes in the optical signal, and extracting information related to sound detected on the optical line system based on the SOP changes.

The information can include a plurality of different locations in the optical line system, and wherein the method can include localizing the sound to the plurality of different locations. The information can be analog modulated on an SOP envelope by a polarization controller at the location. The information can be digitally modulated on an SOP envelope by a polarization scrambler at the location. An SOP is modulated on an order of 100s of kHz or less thereby having no impact on traffic modulated thereon.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for detecting and localizing vibrations with an optical network. Specifically, the present disclosure utilizes existing optical line systems that are deployed for communication, including data center, terrestrial and submarine systems, to provide acoustic signal detection as well as localization. Various use cases exist including submarine detection, security for data centers, and the like. The approach described herein includes encoding the detected sound signals and location, i.e., a specific line amplifier site. In an embodiment, the detected sound signals and location are modulated on traffic carrying signals via a polarization scrambler. Other embodiments include incorporating the detected sound signals and location in a communication channel, such as via an Optical Service Channel (OSC).

Figure 1:
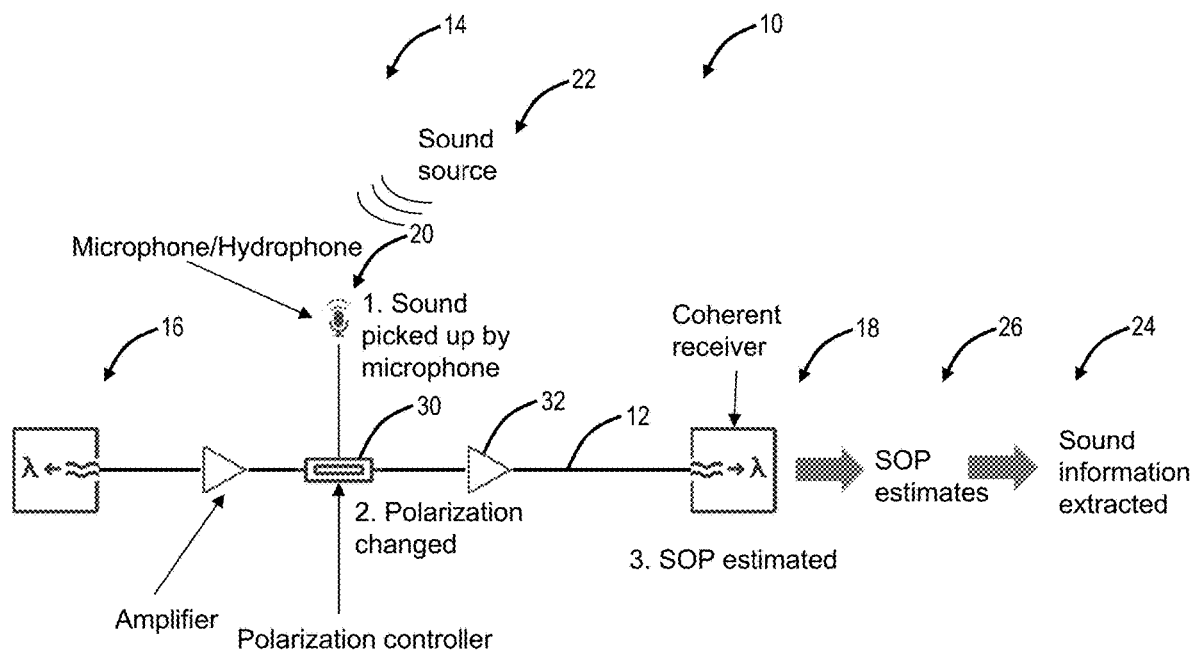
FIG. 1 is a block diagram of an optical line system that provides optical communication as well as supports acoustic signal detection.

There is continuous interest in using many types of sensor technologies for detecting vibrations and acoustic signals. Optical fibers can potentially be used for both types of sensing. This disclosure proposes a system specifically designed to detect and characterize acoustic signals. Detection of acoustic signal broadens the application of optical network sensing to more interesting use cases, where loudness is a more distinguishing feature of something being tracked than the vibrations caused by it. For example, in military use cases the ability to detect passing ships may be a good functionality, which cannot be done by detecting vibrations. In a data center, detecting the change in the sound produced by fans, or sounds of maintenance personnel may create a record that can be used for root cause analysis (RCA) of network problems Optical System FIG. 1 is a block diagram of an optical line system 10 that provides optical communication as well as supports acoustic signal detection. For illustration purposes, the optical line system 10 is illustrated with a single optical fiber 12, a single line amplifier site 14, a transmitter 16, and a receiver 18. Those skilled in the art will recognize a practical implementation can include two fibers 12 (bi-directional communication), significantly more line amplifier sites 14 (e.g., every 50-100 km or so), as well as various other optical components which are known in the art but omitted here for illustration simplicity. In an embodiment, the transmitter 16 and the receiver 18 are coherent modems supporting polarization multiplexing.

In an embodiment, a microphone 20 is used to embed sound waves into polarization on the fiber 12, commensurate with received acoustic signals 22. The polarization changes are observable by the coherent optical receiver 18 and estimated when the optical signal is processed by circuitry (e.g., via a Digital Signal Processor (DSP)) to extract the transmitted bits. Information 24 related to the sound and location can then be extracted from estimated state-of-polarization (SOP) 26. Of note, the microphone 20 can be configured to detect sound about some threshold, as opposed to continually transmitting any detected sound.

The polarization can be changed using a polarization controller/scrambler 30 that can be located before/after optical amplifiers 32. For example, the microphone 20 and the polarization controller/scrambler 30 can be located in a line amplifier module, part of a separate module connected to the line amplifiers 32, and the like. The polarization controller/scrambler 30 can be placed anywhere in-line in the optical line system 10, but it may be easiest to place it within a network element before or after the optical amplifier. That is, physical implementations may vary.

Polarization is changed using the polarization controller/scrambler 30 by receiving an electrical signal from the microphone 20 corresponding to the sound heard by the microphone 20. After the optical signal is received at the coherent receiver 18, the polarization changes can be extracted by first estimating state-of-polarization (SOP) 26 on the fiber 12 and then extracting the sound information from received sound embedded in the SOP 26. The SOP 26 is normally estimated during coherent detection at the receiver 18.

Encoding Sound Information in Optical Signal SOP

The coherent receiver 18 can detect and track SOP changes within a limited speed without penalty or with a small insignificant penalty to the required Signal-to-Noise (SNR) (i.e., a regular coherent modem can track SOP change with approximately ten(s), hundred(s), and thousand(s) KHz of speed without penalty). Therefore, it is safe to encode the detected sound information in the SOP 26 of the coherent signals for the receiver 18 to detect with no impact to the margin or to the operation of the optical line system 10 for communication.

In addition, due to random SOP changes introduced by the optical fiber 12, it is impossible to control the exact SOP to be received by coherent receiver 18. Therefore, the present disclosure proposes to encode the sound information in the envelope of the SOP change, where the absolute SOP can be randomly changed within the envelope.

There are two different implementations of the system types of polarization controlling devices, namely the polarization controller/scrambler 30, that could be used for this application.

System Based on a Polarization Controller

Figure 2:
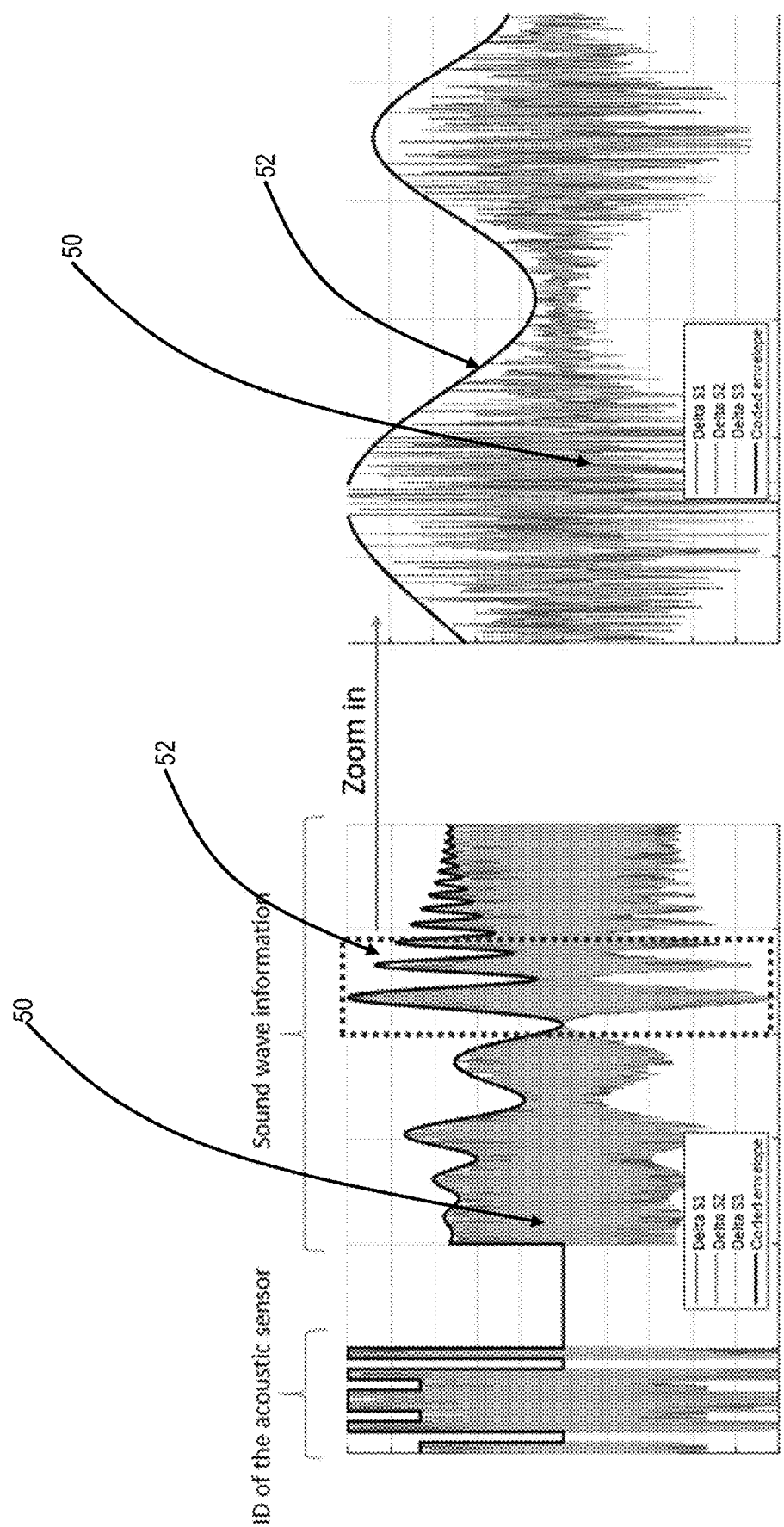
FIG. 2 is a graph illustrating modulation with a polarization controller.

A polarization controller uses several phase retardation plates controlled by an electrical driver to cover any input state of polarization to any selectable output state of polarization. FIG. 2 is a graph illustrating modulation with a polarization controller. If a polarization controller is used, the envelope of the SOP change can be modulated in an analog manner. Lines 50 illustrate the delta of the three Stokes parameters between a current sample and the previous sample, i.e., delta $S1 = S1(t) - S1(t-1)$, delta $S2 = S2(t) - S2(t-1)$, delta $S3 = S3(t) - S3(t-1)$.

An envelope 52 of the SOP change can be modulated to encode both the identifier of the acoustic sensor and the exact analog sound waveform. For example, the identifier of the acoustic sensor can be the network element or location along the optical line system 10 where the microphone 20 and polarization controller 30. In addition, in the zoom-in view, it shows that the SOP changes randomly within the envelope 25. It should be noted that this example is only to illustrate the capability of analog modulation of SOP change envelop using a polarization controller 30. The analog sound waveform can also be digitized and encoded digitally to the envelop of SOP change with a polarization controller.

System Based on a Polarization Scrambler

Figure 3:
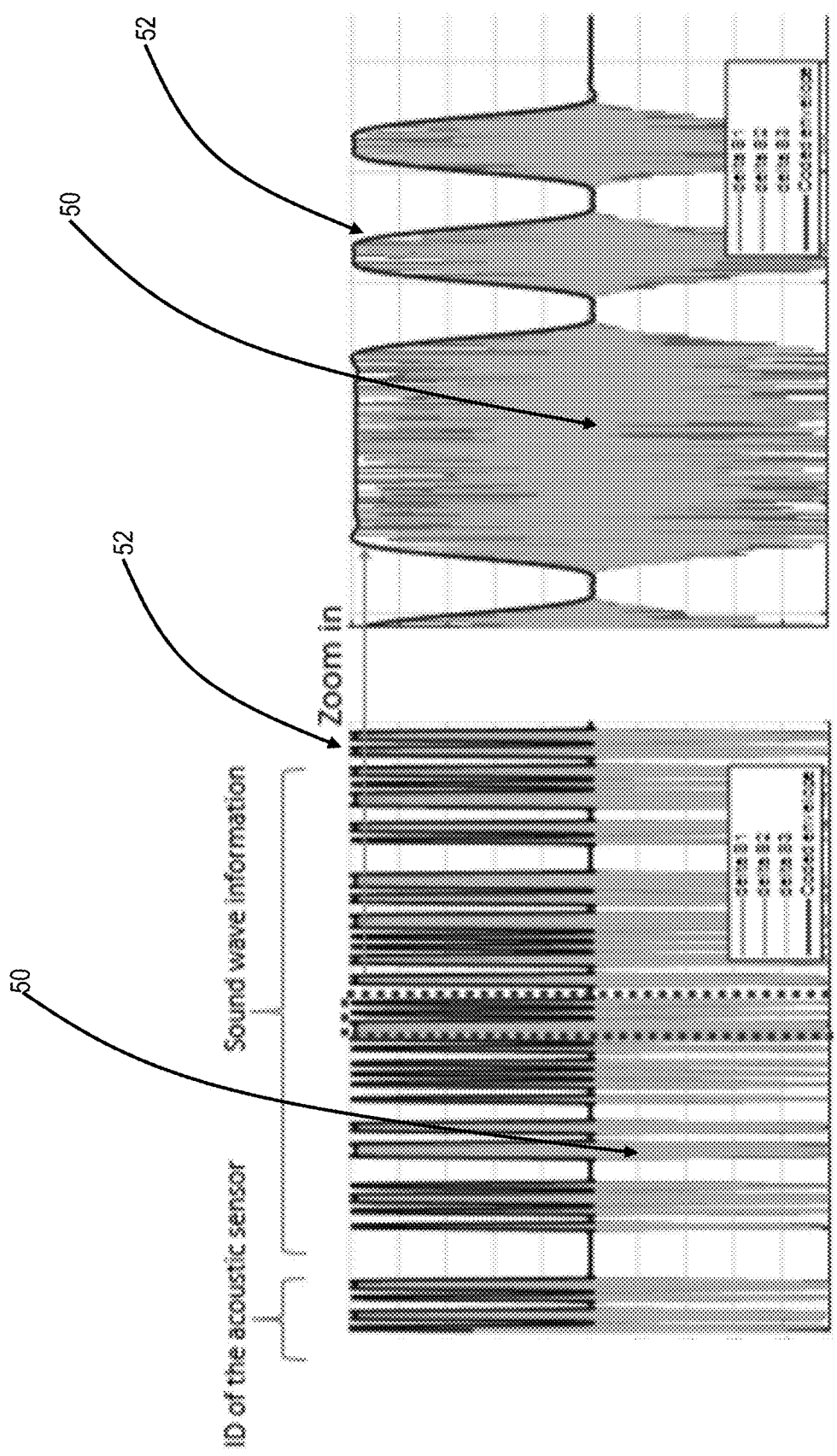
FIG. 3 is a graph illustrating modulation with a polarization scrambler, where the scrambling is being turned on and off to generate the envelope of the SOP change.

A polarization scrambler randomly rotates the state of polarization of the optical signal at a selected speed with a DC electrical control signal. FIG. 3 is a graph illustrating modulation with a polarization scrambler, where the scrambling is being turned on and off to generate the envelope of the SOP change. If a polarization scrambler is used, the envelope of SOP change can only be modulated by turning on and off the electrical control signal. Therefore, information can be encoded digitally with "0" and "1". The sound could be encoded digitally using an analog to digital converter (ADC) by the microphone 20 and then a stream of 1 and 0s is passed on to the polarization scrambler 30.

Other System Embodiments

At the receiver 18, the information can be passed along to higher layers, such as a network management system (NMS), software defined networking (SDN) controller, element management system (EMS), and the like. From here, the information can be presented to end users, such as via alerts, alarms, notifications, etc.

Modulation of the envelope 52 of the SOP change is one technique to convey the location and sound to the receiving end. Those skilled in the art will recognize the location and sound information can be transmitted in other manners such as via packetized data in a communication channel (OSC) and the like. The location can be added to packets transmitted on the OSC channels.

Terrestrial Use Cases

Figure 4:
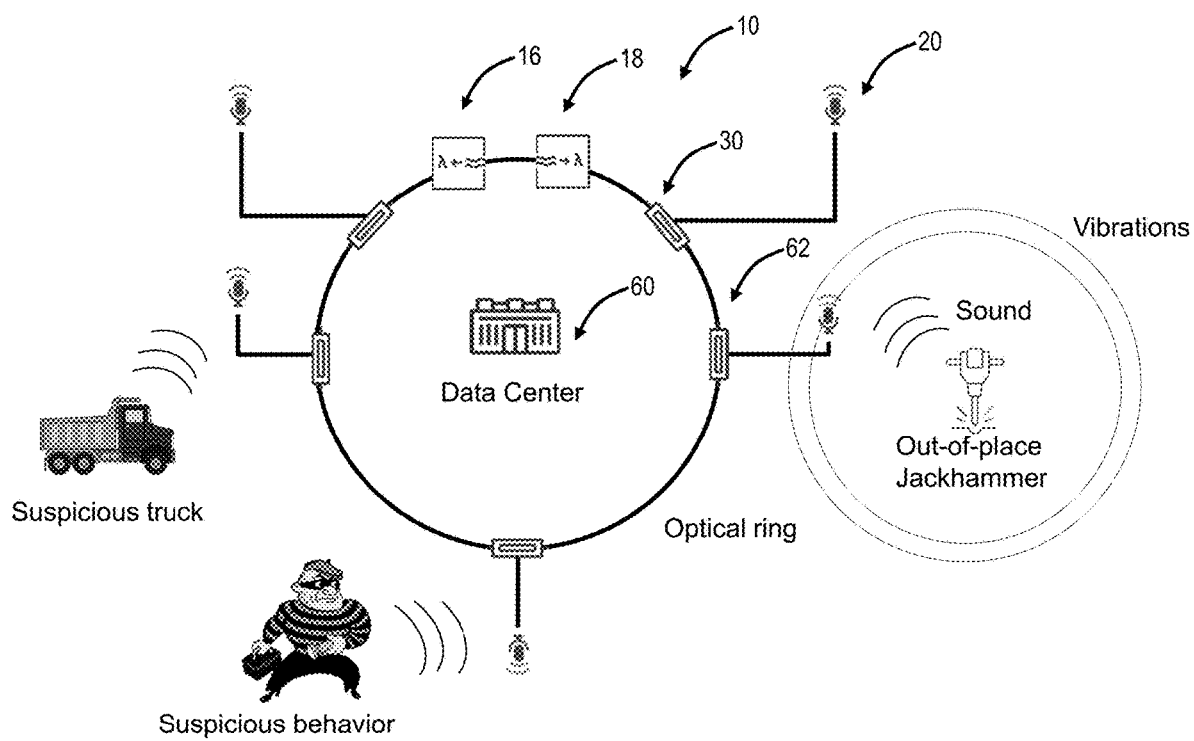
FIG. 4 is a network diagram of a data center utilizing the optical line system of FIG. 1.

The main terrestrial use case is securing infrastructure by detecting suspicious activity. FIG. 4 is a network diagram of a data center 60 utilizing the optical line system 10. For example, an optical ring 62 can be setup around a place of high value (data center 60). The optical ring 62 could be used for an existing purpose such as transmitting video footage or could be setup exclusively for security purposes. The cable could be used to detect vibrations, such as a working jackhammer. However, while this use case may be useful in the case of a fiber carrying high priority network traffic (to predict cable breaks), it is not that useful in the security setting where a jackhammer is not a threat. The knowledge of a working jackhammer in this situation is not that useful as (1) it does not indicate suspicious activity and (2) if the cable breaks traffic disruption could be minimal.

On the other hand, detecting a truck too close to the datacenter when it is not supposed to be there or other suspicious human activity would be useful, but can be done mostly through acoustic means. Inside the data center, the cable could be used to detect the sound of cabinet doors closing, people walking, people talking and fans.

Naval Use Cases

In the naval use case, the fiber 12 is located under water. The security perimeter established with this approach can be much larger as the sound travels further and faster in the water than in the air—the range of an underwater microphone 20 is measured in tens or hundreds of kilometers. Sound also travels about five times faster under water, making underwater detection quicker.

Figure 5:
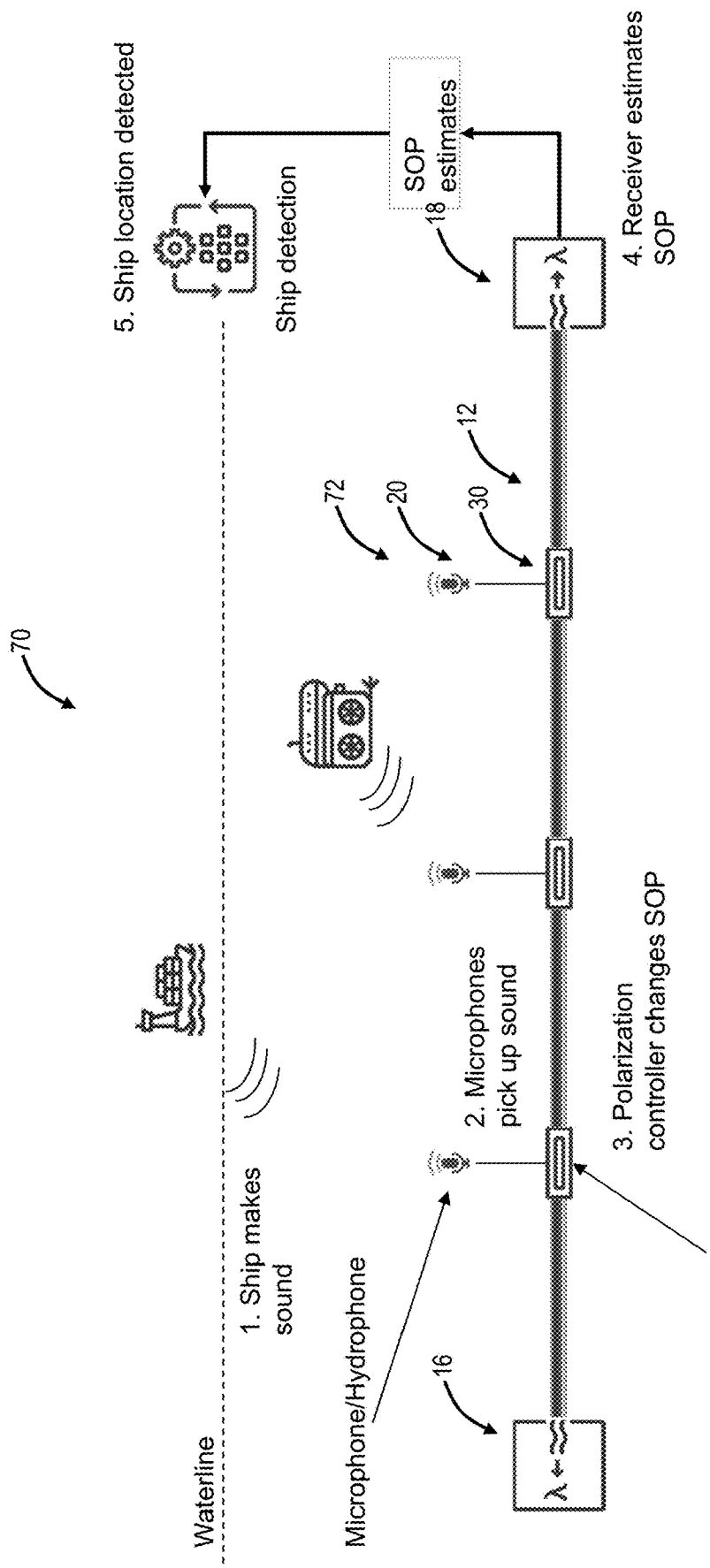
FIG. 5 is a network diagram of a submarine optical line system utilizing the optical line system of FIG. 1.

FIG. 5 is a network diagram of a submarine optical line system 70 utilizing the optical line system 10. The submarine optical line system 70 includes the transmitter 16 and the receiver 18 located on land in submarine cable landing sites. The fiber 12 is located under water with repeaters 72, i.e., line amplifiers spaced along the way. The repeaters 72 can include the microphone 20 and the polarization controller/scrambler 30 embedded therein.

The submarine optical line system 70 can be used to detect:

1) A ship passing the fiber makes noises, for example from its propeller.

2) The microphone 20 picks up the sound from the ship and electronically transfers to the sound to a polarization controller.

3) The polarization controller 30 induces a change in the SOP corresponding to the sound (for example as the time waveform of the sound).

4) The coherent receiver 18 estimates the SOP during its operation and transfers the SOP estimates to a ship detection module 5) A ship detection module uses the received SOP to localize the ship.

Optical Cable as a Microphone Array

As the optical fiber 12 may span a long distance (especially in the submarine use case), there could be many microphones 20 associated with the cable. That means the cable with the microphones 20 and polarization controllers 30 is in fact a microphone array, which could be used to localize where sounds are coming from by determining the angle at which the sounds are coming in. This is sometimes called a distributed acoustic sensor (DAS).

The novelty here is the array itself, which is created from a number of microphones combined with a polarization controller/scrambler. The following is added as an example to show how to use this new type of microphone array for directionality finding.

Source Signal Localization (SSL) of single source can be solved with a common class algorithms based on estimating the time difference of arrival (TDOA) between pairs of microphones. The most common method for estimating the TDOA between two microphones is by using the correlation between the signals through maximization of their generalized cross-correlation (GCC), a filtered cross-correlation of two sequences in time-domain. The GCC can be used with different weighting schemes, but the basic idea is that the TDOA is the delay which corresponds to a peak in the correlation between the signals. For arrays with more than two sensors the pairwise delays are usually averaged in some way to find the source location. Even though there are computational advantages of this pairwise treatment of the microphones signals these algorithms do not exploit the full potential of using multiple microphones.

Figure 6:
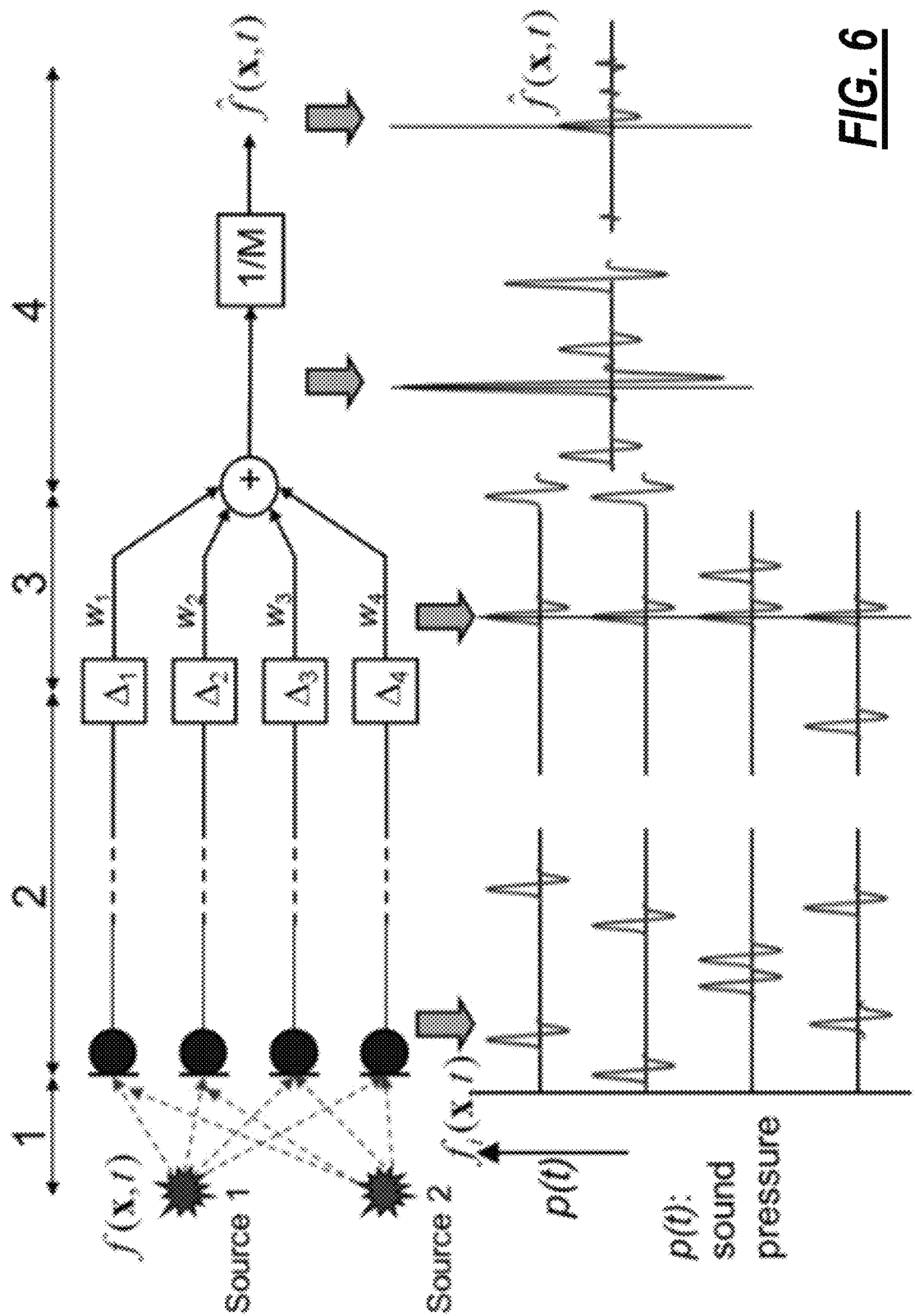
FIG. 6 is a diagram if a beamforming illustration for separating sequences in the time-domain.

FIG. 6 is a diagram if a beamforming illustration for separating sequences in the time-domain.

Delay-and-sum is a well-known technique for this purpose, given a known direction of arrival (DOA) and time delays. It sums the delayed signal depending on the direction of arrival of the sound waves. This produces destructive interference in all directions but the direction of arrival. There are different microphone arrays shapes and types, so each singular microphone may capture the same sound differently. We note that these array shapes can be achieved with optical cables by appropriately placing microphones.

Weighted-delay-and-sum is a generalized form of delay-and sum, with signal samples $x_i(t)$ from each microphone $M_i$ delayed by $d_i$ samples, multiplied by $w_i(t)$ weights and then summed. By doing this, the output signal $p_{tot}(t)$ in the discretetime domain corresponds to:

$$P_{tot}(t) = \sum_{i=0}^{k} w_i \cdot x_i(t - d_i) \tag{1}$$

The delay for each microphone is given by $$d_i = \frac{\Delta_i - \sin\theta}{c}$$

where $\Delta_i$ is the distance between the microphone and the reference microphone. The angle of incidence (AOI) is θ, which corresponds to the angle between the main response axis (MRA) and DOA, finally c is the propagation speed of sound in the medium.

The signals of all channels are summed up and finally, the sum signal is normalized by the number of microphone channels in (1). The amplitude of $p_{tot}$ is used to detect the existence of source in that direction considering the estimation of background noise is available. Having determined AOI allows one to draw an imaginary line to intersect with the target plane (sea surface) to locate the source.

More elaborate methods are also possible if the microphones are in a grid (by having microphones on parallel fibers), which can locate a sound in a three-dimensional space. Note, that in a data center, it would especially be easy to put microphones in a grid, if they are associated with cabinets where the network equipment is stored.

In an embodiment, where the SOP is digitally modulated, multiple transmitters can share the channel such as via circuitry that scrambles the signal with a code, such as a Walsh code or another kind of pn-code used in CDMA. Each transmitter can have a unique code, so when the signal is descrambled, the code identity is also the location of the circuitry.

Optical Network Element

In an embodiment, an optical network element includes a connection to an optical fiber 12 in an optical line system 10 including a coherent receiver 16; a microphone 20 configured to detect sound; and circuitry connected to the microphone 20 and configured to cause transmission of details related to sounds detected by the microphone to a receiver at an end of the optical line system, wherein the transmission is over the optical fiber 12 in the optical line system 10 to the coherent receiver 16.

The optical network element can further include a polarization controlling device 30 connected to the circuitry and configured to modulate a state-of-polarization (SOP) envelope for the transmission. The polarization controlling device can be a polarization controller and the transmission includes analog modulation of the SOP envelope. The polarization controlling device can be a polarization scrambler and the transmission includes digital modulation of the SOP envelope. The SOP is modulated on an order of 100s of kHz or less thereby having no impact on traffic modulated thereon.

The optical line system can be a submarine system with the optical network element including a repeater therein including one or more optical amplifiers. The optical line system can be a terrestrial system deployed in an optical ring with the optical network being one of a plurality of optical network elements on the optical ring.

Coherent Optical Receiver and Process

Figure 7:
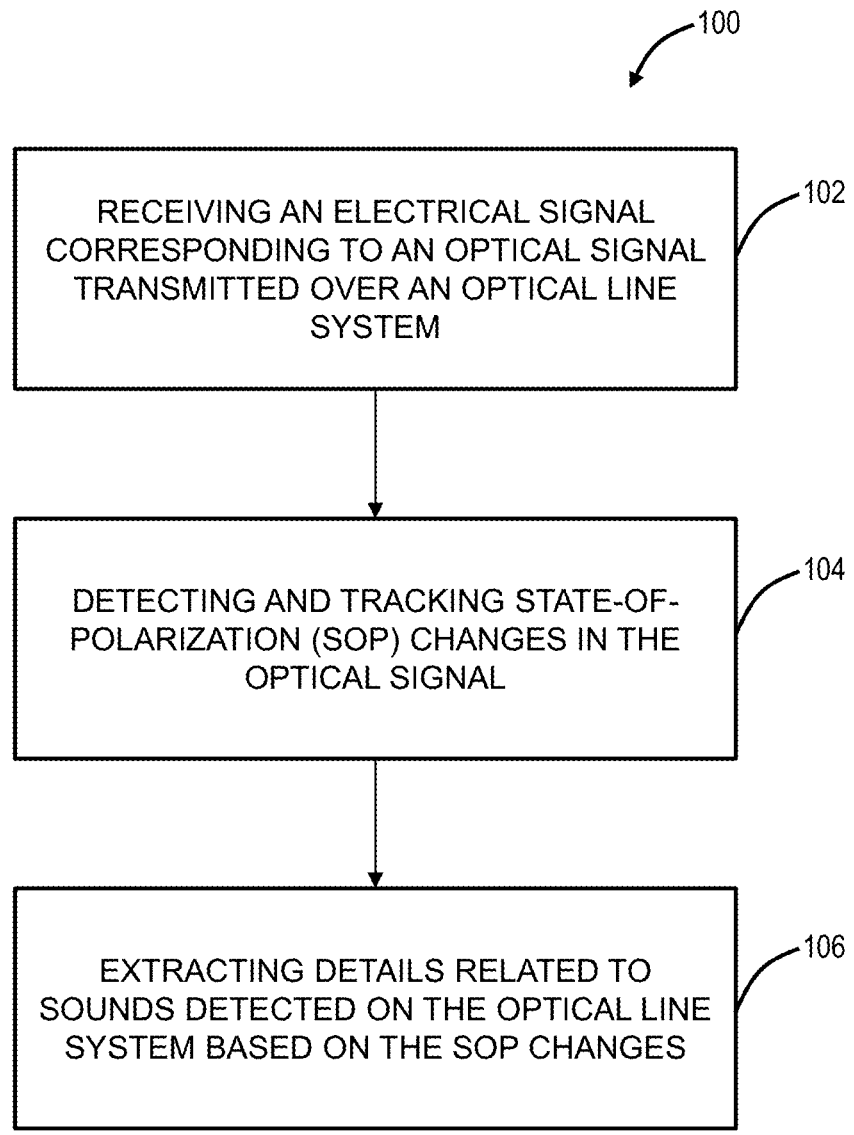
FIG. 7 is a flowchart of a process implemented at a coherent optical receiver to detect sounds along an optical line system of FIG. 1.

FIG. 7 is a flowchart of a process 100 implemented at a coherent optical receiver 18 to detect sounds along an optical line system. The process 100 includes receiving an electrical signal corresponding to optical signals transmitted over an optical line system (step 102), detecting and tracking state-of-polarization (SOP) changes in the optical signal (step 104), and extracting details related to sounds detected on the optical line system based on the SOP changes (step 106).

The details can include a plurality of different locations in the optical line system, and the process 100 can further include localizing the sounds to the plurality of different locations. The details can be analog modulated on an SOP envelope by a polarization controller at the location. The details can be digitally modulated on an SOP envelope by a polarization scrambler at the location. The SOP is modulated on an order of 100s of kHz or less thereby having no impact on traffic modulated thereon.

The optical line system can be a submarine system with the location including a repeater therein including one or more optical amplifiers. The optical line system can be a terrestrial system deployed in an optical ring.

Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An optical network element comprising:
a connection to an optical fiber in an optical line system including a coherent receiver, wherein the optical network element is at a location in the optical line system, separate from the coherent receiver;
a microphone configured to detect sound;
circuitry connected to the microphone and configured to cause transmission of information related to sound detected by the microphone to a receiver at an end of the optical line system, wherein the information is modulated on one or more traffic carrying signals carried over the optical fiber, wherein the transmission is over the optical fiber in the optical line system to the coherent receiver; and
a polarization controlling device connected to the circuitry and configured to modulate a state-of-polarization (SOP) envelope for the transmission of the information, wherein the polarization controlling device is a polarization scrambler and the transmission includes digital modulation of the SOP envelope.

2. The optical network element of claim 1, wherein the SOP is modulated on an order of 100s of kHz or less.

3. The optical network element of claim 1, wherein the optical line system is a submarine system with the optical network element including a repeater therein including one or more optical amplifiers.

4. The optical network element of claim 1, wherein the optical line system is a terrestrial system deployed in an optical ring with the optical network being one of a plurality of optical network elements on the optical ring.

5. The optical network element of claim 1, wherein the transmission is via packets over a communication channel.

6. A method comprising:
receiving an electrical signal corresponding to an optical signal transmitted over an optical line system,
detecting and tracking state-of-polarization (SOP) changes in the optical signal, and
extracting information related to sound detected on the optical line system based on the SOP changes, wherein the information is from a location in the optical line system and the information is modulated on one or more traffic carrying signals carried over an optical fiber in the optical line system, wherein the extracting information includes estimating the SOP in the optical signal and extracting the information from the estimated SOP.

7. The method of claim 6, wherein the information includes a plurality of different locations in the optical line system, and wherein the method further includes
localizing the sound to the plurality of different locations.

8. The method of claim 6, wherein the information is modulated on an SOP envelope.

9. The method of claim 8, wherein the optical line system randomly changes absolute SOP, and wherein the modulated SOP envelope maintains the information with the randomly changed absolute SOP.

10. An optical network element comprising:
a connection to an optical fiber in an optical line system including a coherent receiver, wherein the optical network element is at a location in the optical line system, separate from the coherent receiver;
a microphone configured to detect sound; and
circuitry connected to the microphone and configured to cause transmission of information related to sound detected by the microphone to a receiver at an end of the optical line system, wherein the information is modulated on one or more traffic carrying signals carried over the optical fiber, wherein the transmission is over the optical fiber in the optical line system to the coherent receiver,
wherein one or more of
the optical line system is a submarine system with the optical network element including a repeater therein including one or more optical amplifiers,
the optical line system is a terrestrial system deployed in an optical ring with the optical network being one of a plurality of optical network elements on the optical ring, and
the transmission is via packets over a communication channel.

11. The optical network element of claim 10, further comprising
a polarization controlling device connected to the circuitry and configured to modulate a state-of-polarization (SOP) envelope for the transmission of the information.

12. The optical network element of claim 11, wherein the polarization controlling device is a polarization controller and the transmission includes analog modulation of the SOP envelope.

13. The optical network element of claim 11, wherein the polarization controlling device is a polarization scrambler and the transmission includes digital modulation of the SOP envelope.

14. The optical network element of claim 11, wherein the SOP is modulated on an order of 100s of kHz or less.

* * * * *